United States Patent
Chen et al.

(10) Patent No.: US 12,468,985 B2
(45) Date of Patent: Nov. 11, 2025

(54) FEDERATED LEARNING FOR IMPROVING MATCHING EFFICIENCY

(71) Applicant: BEIJING BAIDU NETCOM SCIENCE AND TECHNOLOGY CO., LTD., Beijing (CN)

(72) Inventors: Lianghui Chen, Beijing (CN); Yan Fu, Beijing (CN); Yangjie Zhou, Beijing (CN); Jun Fang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1109 days.

(21) Appl. No.: 17/461,979

(22) Filed: Aug. 30, 2021

(65) Prior Publication Data

US 2021/0398026 A1    Dec. 23, 2021

(30) Foreign Application Priority Data

Oct. 16, 2020  (CN) .......................... 202011108493.2

(51) Int. Cl.
  *G06N 20/20*  (2019.01)
  *G06Q 40/03*  (2023.01)
  *H04L 9/30*  (2006.01)

(52) U.S. Cl.
  CPC .............. *G06N 20/20* (2019.01); *H04L 9/30* (2013.01); *G06Q 40/03* (2023.01)

(58) Field of Classification Search
  CPC ........... G06N 20/20; H04L 9/30; G06Q 40/03
  See application file for complete search history.

(56) References Cited

U.S. PATENT DOCUMENTS 7,403,920 B2    7/2008  Nishikiori et al.

FOREIGN PATENT DOCUMENTS

| CN | 108804629 A | 11/2018 |
|---|---|---|
| CN | 110309923 A | 10/2019 |
| CN | 110378487 A | 10/2019 |
| CN | 111125779 A | 5/2020 |
| CN | 111143421 A | 5/2020 |

(Continued)

OTHER PUBLICATIONS

Nishio, Takayuki, and Ryo Yonetani. "Client selection for federated learning with heterogeneous resources in mobile edge." ICC 2019-2019 IEEE international conference on communications (ICC). IEEE, 2019. (Year: 2019).*

(Continued)

*Primary Examiner* — Kevin W Figueroa
(74) *Attorney, Agent, or Firm* — MASCHOFF BRENNAN; Ran Pang; Liang Huang

(57) ABSTRACT

A method includes: sending, by one or more computers, in response to the number of data providers for federated learning being greater than a first threshold, a data field required for the federated learning to a coordinator, the coordinator comprising a computer; receiving, by one or more computers, from the coordinator, information about one or more data providers comprising the required data field, for determining the data providers comprising the required data field as the remaining data providers, wherein (Continued)

the coordinator stores a data field of each data provider; and performing, by one or more computers, federated learning-based modeling with each of the remaining data providers.

13 Claims, 5 Drawing Sheets

(56) References Cited

FOREIGN PATENT DOCUMENTS

| | | | |
|---|---|---|---|
| CN | 111178538 | A | 5/2020 |
| CN | 111291084 | A | 6/2020 |
| CN | 111666460 | A | 9/2020 |
| CN | 111666987 | A | 9/2020 |
| JP | 2001-265959 | A | 9/2001 |
| JP | 2004-30488 | A | 1/2004 |
| JP | 2017-167748 | A | 9/2017 |
| JP | 2020-528588 | A | 9/2020 |
| JP | 2020-528589 | A | 9/2020 |
| WO | 2019/032156 | A1 | 2/2019 |
| WO | 2019/032157 | A1 | 2/2019 |
| WO | 2020/147965 | A1 | 7/2020 |
| WO | 2020177392 | A1 | 9/2020 |
| WO | 2020/192896 | A1 | 10/2020 |

OTHER PUBLICATIONS

AbdulRahman, Sawsan, et al. "A survey on federated learning: The journey from centralized to distributed on-site learning and beyond." IEEE Internet of Things Journal 8.7 (2020): 5476-5497. (Year: 2020).*

Jia et al., "The Application of Federated Learning Model in Confidential Data Processing," Fund Project: China Postdoctoral Science Foundation, 2020, pp. 43-49.

Luo et al., "Online Federated Incremental Learning Algorithm for Blockchain," Fund Project: National Natural Science Foundation of China and Tangshan Science and Technology Project, 2021, 9 pages.

Doku et al., "Towards Federated Learning Approach to Determine Data Relevance in Big Data," IEEE 20th International Conference on Information Reuse and Integration for Data Science (IRI), 2019, pp. 184-192.

Bao et al., "FLChain: A Blockchain for Auditable Federated Learning with Trust and Incentive" 5th International Conference on Big Data Computing and Communications (BIGCOM), 2019, 9 pages.

* cited by examiner

FEDERATED LEARNING FOR IMPROVING MATCHING EFFICIENCY

CROSS REFERENCE TO RELATED APPLICATIONS

This application claims priority to Chinese Patent Application No. 02011108493.2, filed on Oct. 16, 2020, the contents of which are hereby incorporated by reference in their entirety for all purposes.

TECHNICAL FIELD

The present disclosure relates to the technical field of artificial intelligence, specifically, to deep learning, and in particular to a federated learning method and device for improving matching efficiency, an electronic device, and a medium.

BACKGROUND

Federated learning is a distributed machine learning technology that breaks data islands and releases the potential of AI applications, allowing various participants in the federated learning to implement joint modeling by exchanging encrypted intermediate machine learning results without disclosing underlying data and an underlying data encryption (obfuscation) form. The federated learning has been widely used in service innovation scenarios in industries, such as finance and the consumer Internet.

The methods described in this section are not necessarily methods that have been previously conceived or employed. It should not be assumed that any of the methods described in this section is considered to be the prior art just because it is included in this section, unless otherwise indicated expressly. Similarly, the problem mentioned in this section should not be considered to be universally recognized in any prior art, unless otherwise indicated expressly.

SUMMARY

According to one aspect of the present disclosure, a computer-implemented method is provided, the method comprising: sending, by one or more computers, in response to the number of data providers for federated learning being greater than a first threshold, a data field required for the federated learning to a coordinator, the coordinator comprising a computer; receiving, by one or more computers, from the coordinator, information about one or more data providers comprising the required data field, for determining the data providers comprising the required data field as the remaining data providers, wherein the coordinator stores a data field of each data provider; and performing, by one or more computers, federated learning-based modeling with each of the remaining data providers.

According to another aspect of the present disclosure, a computer-implemented method is provided, the method comprising: receiving, by one or more computers, from a data user, a data field required by the data user for federated learning; comparing, by one or more computers, the received data field with a stored data field of each data provider to obtain a comparison result; determining, by one or more computers, based on the comparison result, one or more data providers comprising the required data field; and sending, by one or more computers, to the data user, information about the one or more determined data providers comprising the required data field.

According to still yet another aspect of the present disclosure, an electronic device is provided, the electronic device comprising: a memory storing one or more programs configured to be executed by one or more processors, the one or more programs including instructions for causing the electronic device to perform operations comprising: sending, in response to the number of data providers for federated learning being greater than a first threshold, a data field required for the federated learning to a coordinator; receiving, from the coordinator, information about one or more data providers comprising the required data field, for determining the data providers comprising the required data field as the remaining data providers, wherein the coordinator stores a data field of each data provider; and performing federated learning-based modeling with each of the remaining data providers.

According to still yet another aspect of the present disclosure, a non-transitory computer-readable storage medium that stores one or more programs comprising instructions that, when executed by one or more processors of an electronic device, cause the electronic device to implement operations comprising:

sending, in response to the number of data providers for federated learning being greater than a first threshold, a data field required for the federated learning to a coordinator, the coordinator comprising a computer; receiving, from the coordinator, information about one or more data providers comprising the required data field, for determining the data providers corresponding to information comprising the required data field as the remaining data providers, wherein the coordinator stores a data field of each data provider; and performing federated learning-based modeling with each of the remaining data providers.

According to still yet another aspect of the present disclosure, an electronic device is provided, the electronic device comprising: a memory storing one or more programs configured to be executed by one or more processors, the one or more programs including instructions for performing operations comprising: receiving, from a data user, a data field required by the data user for federated learning; comparing the received data field with a stored data field of each data provider to obtain a comparison result; determining, based on the comparison result, one or more data providers comprising the required data field; and sending, to the data user, information about the one or more determined data providers comprising the required data field.

According to still another aspect of the present disclosure, a non-transitory computer-readable storage medium that stores one or more programs comprising instructions that, when executed by one or more processors of an electronic device, cause the electronic device to implement operations comprising: receiving, from a data user, a data field required by the data user for federated learning; comparing the received data field with a stored data field of each data provider to obtain a comparison result; determining, based on the comparison result, one or more data providers comprising the required data field; and sending, to the data user, information about the one or more determined data providers comprising the required data field.

These and other aspects of the present disclosure will be clear from the embodiments described below, and will be clarified with reference to the embodiments described below.

BRIEF DESCRIPTION OF THE DRAWINGS

The drawings exemplarily show the embodiments and constitute a part of the description for explaining the exemplary implementations of the embodiments together with the textual description of the description. The embodiments shown are merely for illustrative purposes and do not limit the scope of the claims. Throughout the drawings, like reference signs denote like but not necessarily identical elements.

DETAILED DESCRIPTION OF THE EMBODIMENTS

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of the listed items.

With the development of computer technologies, more and more technologies (big data, distributed, blockchain, artificial intelligence, etc.) are applied in the financial field. Traditional financial industry is gradually transforming to Fintech. However, due to requirements for security and real-time performance in the financial industry, higher requirements have also been imposed on technologies. As a modeling method for ensuring data security, federated learning has broad application prospects in finance, because data cannot be directly aggregated for machine learning-based model training in this industry due to factors such as intellectual property rights, privacy protection, and data security. With characteristics of federated learning, a machine learning model may be jointly constructed for three parties without exporting enterprise data. This not only fully protects user privacy and data security, but also provides users with personalized products and services, thereby bringing benefits to all of the plurality of parties.

The general scenario of existing federated learning modeling is that one party is data user and another party is data provider. It should be understood that the data user and the data provider are not always designated as one or several participants participating in federated learning modeling, that is, the participant, which was a data user previously, may also provide modeling data as a data provider when another participant in the federated learning modeling initiates a joint modeling request. Accordingly, the participant, which was a data provider previously, may also initiate a joint modeling request to seek for, as a data user, cooperation with another participant in the federated learning modeling.

Figure 1:
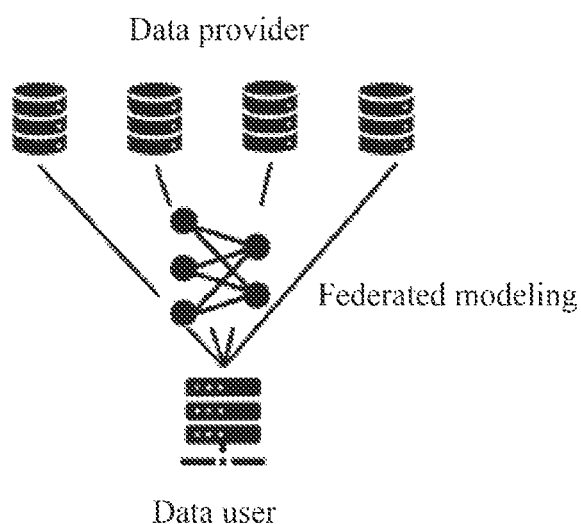
FIG. 1 shows a schematic diagram of an existing federated learning-based modeling scenario.

With the continuous development in the financial field and the continuous increase in user requirements, it is no longer just federated learning-based modeling between one data user and one data provider, but may be more likely joint modeling between a plurality of enterprises, with the intention to adapt to service changes and the growth of user requirements. Therefore, as shown in FIG. 1, there may be the case where a plurality of data providers participate in federated learning-based modeling, that is, a plurality of enterprises have cooperation or all are members of an organization. Due to service differences between enterprises, when there are many data providers, not every data provider has data that matches the requirement of a data user initiating federated learning-based modeling. If the data user performs joint modeling with each data provider, some models may have undesirable effects, which instead results in a waste of computing resources. Therefore, before federated learning-based modeling, manual combing and judgment are required to filter out data providers that do not meet the requirement of the data user. If there are many data providers for participation, a relatively long combing time may be required, which causes inefficiency. Moreover, the manual judgment relies heavily on the level of an expert. Compared with other fields, the financial field has more complicated data structures and service scenarios, and the manual judgment is comparatively subjective and arbitrary. Therefore, there are problems that an evaluation result is not objective, and accurate enough and the efficiency is low.

Figure 2:
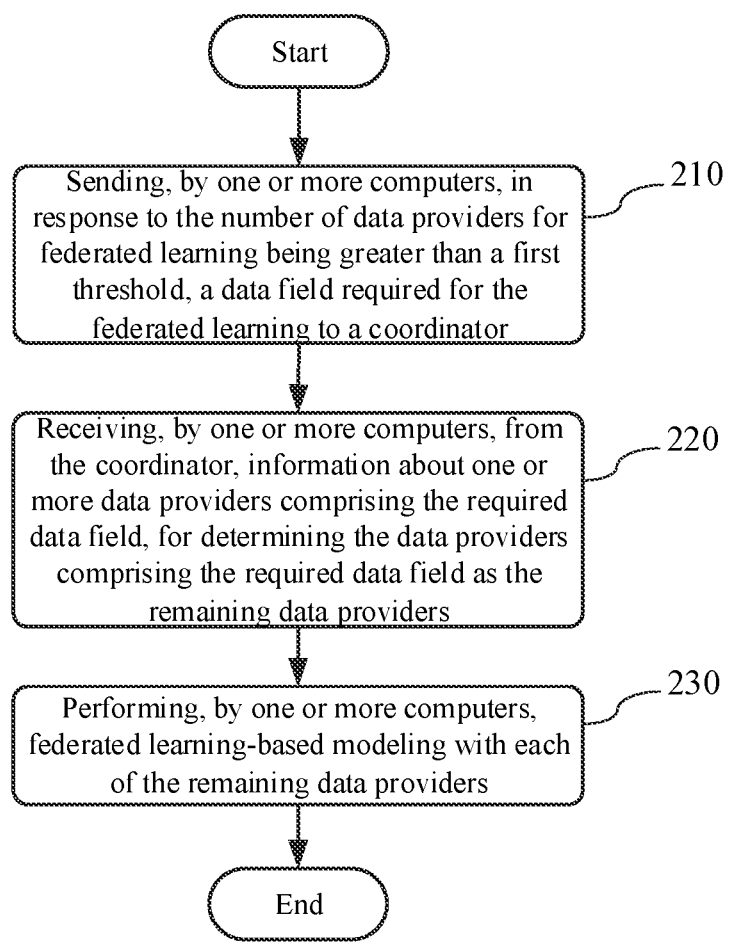
FIG. 2 shows a flowchart of a federated learning-based modeling method for improving matching efficiency according to an exemplary embodiment of the present disclosure.

Therefore, according to one aspect of the present disclosure, as shown in FIG. 2, a federated learning method for improving matching efficiency is provided, the method comprising: sending, by one or more computers, in response to the number of data providers for federated learning being greater than a first threshold, a data field required for the federated learning to a coordinator, the coordinator comprising a computer (step 210); receiving, by one or more computers, from the coordinator, information about one or more data providers comprising the required data field, for determining the data providers comprising the required data field as the remaining data providers, wherein the coordinator stores a data field of each data provider (step 220); and performing, by one or more computers, federated learning-based modeling with each of the remaining data providers (step 230).

According to one aspect of the present disclosure, by means of the federated learning method for improving matching efficiency, screening may be performed on data providers based on a coordinator, and the coordinator stores data fields, such that data does not need to be transmitted for matching before model training each time, thereby improving the calculation efficiency. Moreover, the coordinator that both parties trust and is a third party, stores and compares data fields, which also prevents the leakage of data information between the two parties.

Figure 3:
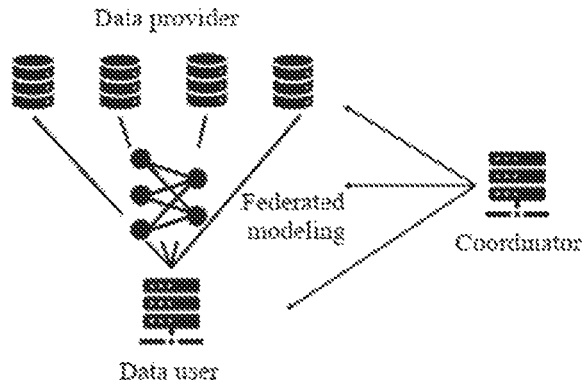
FIG. 3 shows a schematic diagram of an exemplary scenario in which various methods described herein may be implemented, according to an embodiment of the present disclosure.

FIG. 3 shows a schematic diagram of an exemplary scenario in which various methods described herein may be implemented, according to an embodiment of the present disclosure. In the federated learning-based modeling scenario shown in FIG. 3, with the coordination of a coordinator, a data user may perform joint modeling with a plurality of data providers. Although an example of four data providers is shown in FIG. 3, it may be understood that, any number of the data providers may be possible, and it is merely a schematic illustration here. In some examples, the coordinator stores a data field name or other expressions provided by the data provider. Generally, as a corresponding enterprise and platform, the data provider collects and stores user data fields that generally do not need to be changed frequently. Therefore, the data field name of the data provider may be stored in the coordinator, such that a corresponding data provider does not need to send its data field once again to a data user for comparison each time when screening is performed on a data provider for federated learning. As an initiator of federated learning, the data user may set a keyword of a required data field and then send the keyword to the coordinator, and the coordinator performs comparison and then returns a comparison result to the data user. The keyword may comprise a field related to loan defaults, such as an income level, a consumption level, a historical loan amount, the number of historical defaults, or a historical default amount.

According to some embodiments, the required data field comprises a time interval, for example, from 2018 to 2020, so as to screen to obtain a data provider comprising the time interval.

In some examples, the first threshold represents a threshold number of the data providers. For example, the first threshold may be 3. When the number of the data providers is greater than 3, screening may be performed on the data providers by using the method according to the present disclosure. If there are many data providers, the modeling efficiency may be greatly improved by using the method according to the present disclosure.

According to some embodiments, the method according to the present disclosure further comprises: acquiring, by one or more computers, in response to the number of the remaining data providers being greater than the first threshold, a first public key from the coordinator to encrypt a local user ID, wherein the local user ID is a user ID of a data user; acquiring a user ID, by one or more computers, which has been encrypted with a second public key, of each of the remaining data providers, wherein the second public key for the remaining data provider is acquired from the coordinator; acquiring, by one or more computers, an overlap rate by comparing the local user ID with the acquired user ID of each of the remaining data providers; and screening, by one or more computers, to obtain one or more data providers with an overlap rate being greater than a second threshold, to use the one or more data providers obtained by screening as new remaining data providers.

In some examples, after conditional filtering of the foregoing data field is performed, the remaining part of candidate data providers that meet a requirement may be screened. The coordinator may initialize the public key and deliver the public key to the data user and various data providers. A target primary key, for example the user ID, is selected to acquire user IDs, which have been encrypted with the public key, of the remaining data providers. Matching is performed on the acquired user IDs and the user ID, which has been encrypted with the public key, of the data user, so as to determine the number of user IDs that overlap between the data user and each of the remaining data providers, and determine an overlap rate. For example, the overlap rate may be expressed as the number of the overlapping user IDs divided by the total number of user IDs of the data user. It should be understood that other overlap rate calculation methods are also possible. Based on the matching between different data providers, further screening is performed on the data providers.

In some examples, the selected target primary key may further comprise a timestamp. That is, time information is added when a user ID is being sent, such that further matching is performed on the time information when the user IDs are successfully matched, so as to determine whether the time information of the same user being active on different platforms is consistent, and further determine the overlap rate based on a matching result of the time information.

In some examples, according to the cost per reach of customers in a financial scenario, generally, a model can be effective only when the overlap rate is at least 60%, and in this case, the returns exceed the costs. Therefore, data providers with an overlap rate of at least 60% can further be obtained by screening.

According to some embodiments, the public key is generated on the coordinator by using an encryption algorithm. The encryption algorithm may comprise: an RSA algorithm or a Pailler algorithm. It should be understood that any other encryption algorithm that may be used in the present disclosure is also possible, and is not limited herein.

In some examples, in the financial field, the existing user ID may usually be set as a mobile phone number or an ID number of a user. Therefore, if user IDs of both parties are set to be consistent, when the current user IDs are the same, user IDs obtained by encrypting the current user IDs with the same encryption algorithm are also the same, and overlapping users can be easily determined by means of comparison.

According to some embodiments, the method according to the present disclosure further comprises: acquiring, by one or more computers, in response to the number of the remaining data providers being greater than the first threshold, a statistical indicator of respective data fields of the remaining data providers; and performing, by one or more computers, screening on the remaining data providers based on the statistical indicator, to use one or more data providers obtained by screening as new remaining data providers.

In some examples, after conditional filtering of the foregoing data field is performed, the remaining part of candidate data providers that meet a requirement may be screened. In this case, if the number of the remaining data providers is still greater than the first threshold, screening may continue to be performed on a statistical indicator of a data field. The data field with a statistical indicator to be screened may be one or more of the foregoing required data fields.

In some examples, after condition filtering of the target primary key, such as the data field and the user ID, is performed, if the number of the remaining data providers is still greater than the first threshold, screening may continue to be performed on a statistical indicator of a data field. The data field with a statistical indicator to be screened may be one or more of the foregoing required data fields.

According to some embodiments, the statistical indicator comprises one or more of the following: a mean value, a maximum value, and a minimum value.

Generally, as a corresponding enterprise and platform, the data provider collects and stores a statistical indicator of user data that may be changed for a period of time. Therefore, when the data user performs further screening on the data providers remaining after the screening of the data field, the data provider may directly calculate a statistical indicator of a respective field, and then send same to the data user. The data user performs matching on the received statistical indicator with its corresponding demand to further implement the screening of the data provider. As such, the number of instances of data transmission between different terminals is reduced, and computing resources and a response time are reduced.

Based on the determined data field required by the data user, the data user may directly send a request for the statistical indicator of its one or more required data fields to the data provider. The way of the data provider directly feeding back its calculated statistical indicator to the data user also would not cause the leakage of specific user data, and is convenient and fast.

According to some embodiments, the performing federated learning-based modeling with each of the remaining data providers comprises: screening, by one or more computers, feature data that is common with each of the remaining data providers by invoking a feature screening model; and performing, by one or more computers, federated learning-based modeling with each of the remaining data providers based on the feature data.

After the screening of the data provider and the completion of data preprocessing, a meaningful feature needs to be selected and is then input into a machine learning algorithm and model for training. In an actual project, there may be a large number of features that are available, some of which carry rich information, some of which carry overlapped information, and some of which are irrelevant features. If all the features are used as training features without screening, the problem of "curse of dimensionality" will frequently occur, and the accuracy of the model will even be reduced. Therefore, feature screening needs to be performed to exclude invalid/redundant features and select useful features as model training data.

According to some embodiments, the feature screening model may comprise: an XGBoost model or a LightGBM model.

Figure 4:
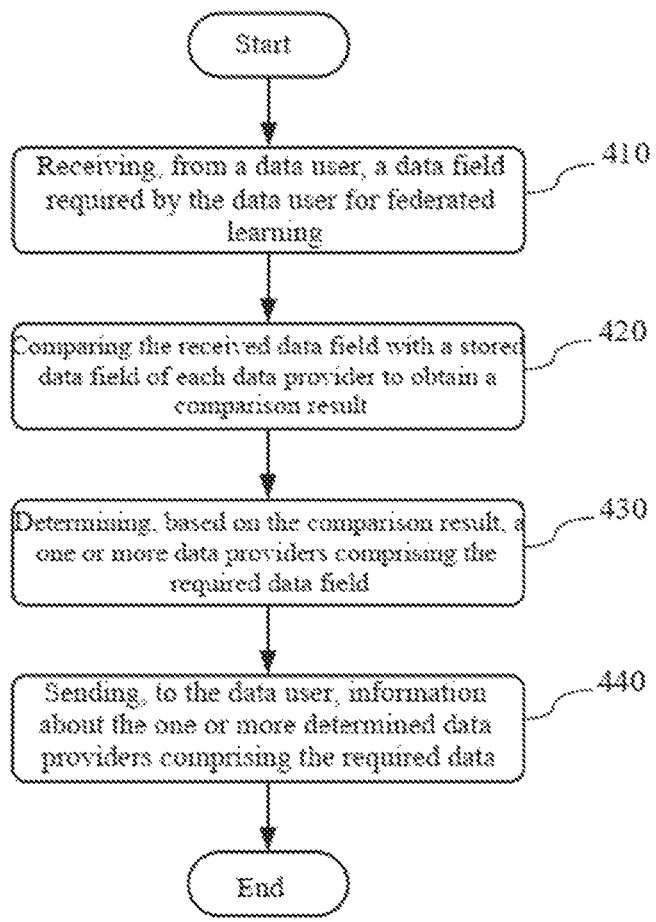
FIG. 4 shows a flowchart of a federated learning-based modeling method for improving matching efficiency according to another exemplary embodiment of the present disclosure.

According to another aspect of the present disclosure, as shown in FIG. 4, a federated learning method for improving matching efficiency is provided, the method comprising: receiving, by one or more computers, from a data user, a data field required by the data user for federated learning (step 410); comparing, by one or more computers, the received data field with a stored data field of each data provider to obtain a comparison result (step 420); determining, by one or more computers, based on the comparison result, one or more data providers comprising the required data field (step 430); and sending, by one or more computers, to the data user, information about the one or more determined data providers comprising the required data (step 440).

According to one aspect of the present disclosure, by means of the federated learning method for improving matching efficiency, screening may be performed on data providers based on a coordinator, and the coordinator stores data fields, such that data does not need to be transmitted for matching before model training each time, thereby improving the calculation efficiency.

Figure 5:
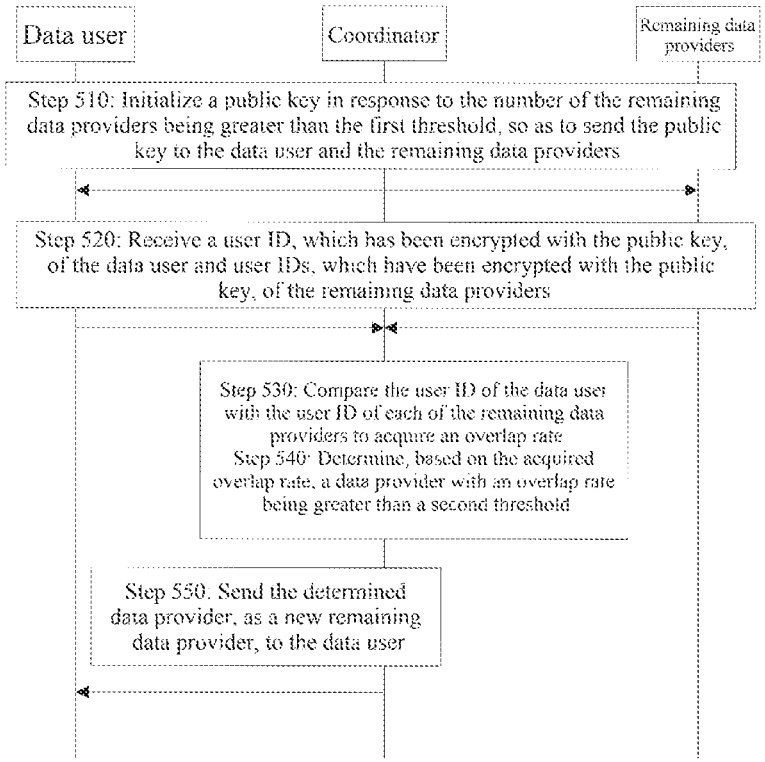
FIG. 5 shows a schematic diagram of performing screening on data providers based on a user ID according to an exemplary embodiment of the present disclosure.

According to some embodiments, as shown in FIG. 5, the method further comprises: initializing a public key in response to the number of the remaining data providers being greater than the first threshold, so as to send the public key to the data user and the remaining data providers (step 510); receiving a user ID, which has been encrypted with the public key, of the data user and user IDs, which have been encrypted with the public key, of the remaining data providers (step 520); comparing the user ID of the data user with the user ID of each of the remaining data providers to acquire an overlap rate (step 530); determining, based on the acquired overlap rate, a data provider with an overlap rate being greater than a second threshold (step 540); and sending the determined data provider, as a new remaining data provider, to the data user (step 550).

In some examples, after the coordinator compares the data fields, if it is confirmed, after the comparison, that the number of the remaining data providers is greater than the first threshold, the user ID of each of the remaining data providers is encrypted with the public key delivered by the coordinator, and is then sent to the coordinator; and the user ID of the data user is also encrypted with the public key (which is the same as the public key delivered to the data provider) delivered by the coordinator, and is then sent to the coordinator. On the coordinator, matching is performed on the encrypted user ID of the data user and the encrypted user ID of each of the remaining data providers. If the user IDs before encryption are the same, the user IDs encrypted with the same public key are generally also the same. Therefore, the number of users that overlap between the data user and each of the remaining data providers can be confirmed.

In some examples, the information for sending may further comprise a timestamp in addition to the user ID. That is, time information is added when a user ID is being sent, such that further matching is performed on the time information when the user IDs are successfully matched, so as to determine whether the time information of the same user being active on different platforms is consistent, and further determine the overlap rate based on a matching result of the time information.

In some examples, according to the cost per reach of customers in a financial scenario, generally, a model can be effective only when the overlap rate is at least 60%, and in this case, the returns exceed the costs. Therefore, data providers with an overlap rate of at least 60% can further be obtained by screening.

According to some embodiments, the public key is generated on the coordinator by using an encryption algorithm. The encryption algorithm may comprise: an RSA algorithm or a Pailler algorithm. It should be understood that any other encryption algorithm that may be used in the present disclosure is also possible, and is not limited herein.

According to some embodiments, the method further comprises: acquiring, in response to the number of the remaining data providers being greater than the first threshold, a required statistical indicator of a respective data field of the data user; acquiring statistical indicators of respective data fields of the remaining data providers; and comparing the required statistical indicator with each of the statistical indicators of the remaining data providers to obtain a comparison result; determining, based on the comparison result, a data provider having a statistical indicator that is the same as the required statistical indicator of the respective data field; and sending the determined data provider, as a new remaining data provider, to the data user.

In an embodiment where the data user cannot directly communicate with the data provider, the matching between the statistical indicators may also be performed by the coordinator. For example, in response to the number of the remaining data providers being greater than the first threshold, the data user sends a statistical demand of the required data field to the coordinator, and the coordinator sends, after receiving the statistical demand, a request for acquiring the data field to a corresponding data provider. The data provider sends the calculated statistical indicator of the data field to the coordinator for comparison. The coordinator feeds back a comparison result to the data user, so as to implement further screening on the remaining data providers.

According to some embodiments, the statistical indicator comprises one or more of the following: a mean value, a maximum value, and a minimum value.

According to some embodiments, the required data field comprises a time interval, for example, from 2018 to 2020, so as to screen to obtain a data provider comprising the time interval.

Figure 6:
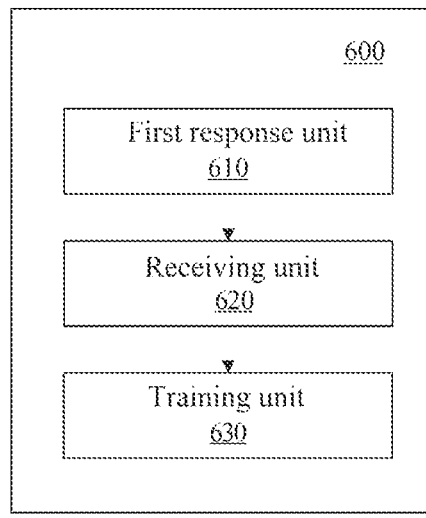
FIG. 6 shows a structural block diagram of a federated learning-based modeling device for improving matching efficiency according to an exemplary embodiment of the present disclosure.

According to still another aspect of the present disclosure, as shown in FIG. 6, a federated learning device 600 for improving matching efficiency is provided, the device comprising: a first response unit 610 configured to send, in response to the number of data providers for federated learning being greater than a first threshold, a data field required for the federated learning to a coordinator; a receiving unit 620 configured to receive, from the coordinator, information about a data provider comprising the required data field, so as to determine remaining data providers, wherein the coordinator stores a data field of each data provider; and a training unit 630 configured to perform federated modeling with each of the remaining data providers.

According to some embodiments, the device further comprises: a second response unit configured to acquire, in response to the number of the remaining data providers being greater than the first threshold, a public key from the coordinator to encrypt a local user ID, wherein the local user ID is a user ID of a data user; an acquisition unit configured to acquire a user ID, which has been encrypted with a public key, of each of the remaining data providers, wherein the public key for the remaining data provider is acquired from the coordinator; a comparison unit configured to compare the local user ID with the acquired user ID of each of the remaining data providers to acquire an overlap rate; and a first screening unit configured to screen to obtain a data provider with an overlap rate being greater than a second threshold, to use the data provider obtained by screening as a new remaining data provider.

According to some embodiments, the device further comprises: a third response unit configured to acquire, in response to the number of the remaining data providers being greater than the first threshold, statistical indicators of respective data fields of the remaining data providers; and a second screening unit configured to perform screening on the remaining data providers based on the statistical indicators, to use a data provider obtained by screening as a new remaining data provider.

According to some embodiments, the statistical indicator comprises one or more of the following: a mean value, a maximum value, and a minimum value.

According to some embodiments, the training unit is configured to perform the following operations: invoking a feature screening model to obtain, by screening, common feature data of each of the remaining data providers; and performing federated modeling with each of the remaining data providers based on the feature data.

According to some embodiments, the required data field comprises a time interval.

Herein, the operations of the foregoing units 610 to 630 of the federated learning device 600 for improving matching efficiency are respectively similar to the operations of steps 210 to 230 described above, and details are not repeated herein.

Figure 7:
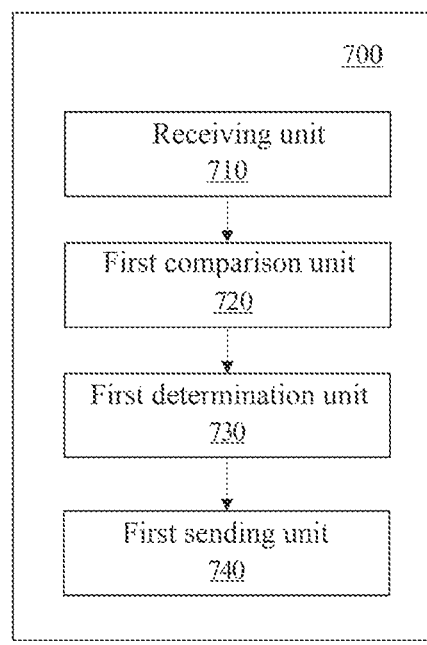
FIG. 7 shows a structural block diagram of a federated learning-based modeling device for improving matching efficiency according to another exemplary embodiment of the present disclosure.

According to still another aspect of the present disclosure, as shown in FIG. 7, a federated learning device 700 for improving matching efficiency is provided, the device comprising: a receiving unit 710 configured to receive, from a data user, a data field required by the data user for federated learning; a first comparison unit 720 configured to compare the received data field with a stored data field of each data provider to obtain a comparison result; a first determination unit 730 configured to determine, based on the comparison result, a data provider comprising the required data field; and a first sending unit 740 configured to send, to the data user, information about the determined data provider comprising the required data field.

According to some embodiments, the device further comprises: a first response unit configured to initialize a public key in response to the number of the remaining data providers being greater than the first threshold, so as to send the public key to the data user and the remaining data providers; a receiving unit configured to receive a user ID, which has been encrypted with the public key, of the data user and user IDs, which have been encrypted with the public key, of the remaining data providers; a second comparison unit configured to compare the user ID of the data user with the user ID of each of the remaining data providers to acquire an overlap rate; a second determination unit configured to determine, based on the acquired overlap rate, a data provider with an overlap rate being greater than a second threshold; and a second sending unit configured to send the determined data provider, as a new remaining data provider, to the data user.

According to some embodiments, the device further comprises: a second response unit configured to acquire, in response to the number of the remaining data providers being greater than the first threshold, a required statistical indicator of a respective data field of the data user; an acquisition unit configured to acquire statistical indicators of respective data fields of the remaining data providers; and a third comparison unit configured to compare the required statistical indicator with each of the statistical indicators of the remaining data providers to obtain a comparison result; a third determination unit configured to determine, based on the comparison result, a data provider having a statistical indicator that is the same as the required statistical indicator of the respective data field; and a third sending unit configured to send the determined data provider, as a new remaining data provider, to the data user.

According to some embodiments, the statistical indicator comprises one or more of the following: a mean value, a maximum value, and a minimum value.

According to some embodiments, the required data field comprises a time interval.

Herein, the operations of the foregoing units 710 to 740 of the federated learning device 700 for improving matching efficiency are respectively similar to the operations of steps 410 to 440 described above, and details are not repeated herein.

According to still yet another aspect of the present disclosure, an electronic device is provided, the electronic device comprising: a processor; and a memory storing a program, wherein the program comprises instructions that, when executed by the processor, cause the processor to perform the federated learning method for improving matching efficiency according to one aspect of the present disclosure.

According to still yet another aspect of the present disclosure, a computer-readable storage medium storing a program is provided, wherein the program comprises instructions that, when executed by a processor of an electronic device, cause the electronic device to perform the federated learning method for improving matching efficiency according to one aspect of the present disclosure.

According to still yet another aspect of the present disclosure, an electronic device is provided, the electronic device comprising: a processor; and a memory storing a program, wherein the program comprises instructions that, when executed by the processor, cause the processor to perform the federated learning method for improving matching efficiency according to another aspect of the present disclosure.

According to still another aspect of the present disclosure, a computer-readable storage medium storing a program is provided, wherein the program comprises instructions that, when executed by a processor of an electronic device, cause the electronic device to perform the federated learning method for improving matching efficiency according to another aspect of the present disclosure.

Figure 8:
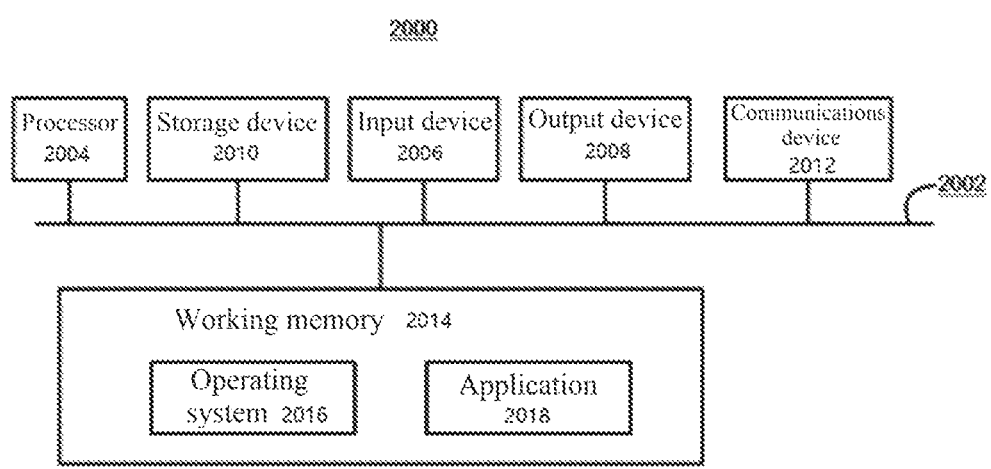
FIG. 8 shows a structural block diagram of an exemplary computing device that can be used to implement an embodiment of the present disclosure.

Referring to FIG. 8, a computing device 2000 is now described, which is an example of a hardware device (an electronic device) that may be applied to various aspects of the present disclosure. The computing device 2000 may be any machine configured to perform processing and/or computation, which may be, but is not limited to, a workstation, a server, a desktop computer, a laptop computer, a tablet computer, a personal digital assistant, a robot, a smartphone, an onboard computer, or any combination thereof. The federated learning methods for improving matching efficiency described above may each be implemented, in whole or at least in part, by the computing device 2000 or a similar device or system.

The computing device 2000 may comprise elements in connection with a bus 2002 or in communication with a bus 2002 (possibly via one or more interfaces). For example, the computing device 2000 may comprise the bus 2002, one or more processors 2004, one or more input devices 2006, and one or more output devices 2008. The one or more processors 2004 may be any type of processors and may include, but are not limited to, one or more general-purpose processors and/or one or more dedicated processors (e.g., special processing chips). The input device 2006 may be any type of device capable of inputting information to the computing device 2000, and may include, but is not limited to, a mouse, a keyboard, a touch screen, a microphone and/or a remote controller. The output device 2008 may be any type of device capable of presenting information, and may include, but is not limited to, a display, a speaker, a video/audio output terminal, a vibrator, and/or a printer. The computing device 2000 may also include a non-transitory storage device 2010 or be connected to a non-transitory storage device 2010. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disc or any other optical medium, a read-only memory (ROM), a random access memory (RAM), a cache memory and/or any other memory chip or cartridge, and/or any other medium from which a computer can read data, instructions and/or code. The non-transitory storage device 2010 can be removed from an interface. The non-transitory storage device 2010 may have data/programs (including instructions)/code for implementing the foregoing methods and steps. The computing device 2000 may further comprise a communication device 2012. The communication device 2012 may be any type of device or system that enables communication with an external device and/or network, and may include, but is not limited to, a modem, a network card, an infrared communication device, a wireless communication device and/or a chipset, e.g., a Bluetooth™ device, a 1302.11 device, a Wi-Fi device, a WiMax device, a cellular communication device, and/or the like.

The computing device 2000 may further comprise a working memory 2014, which may be any type of working memory that may store programs (including instructions) and/or data useful to the working of the processor 2004, and may include, but is not limited to, a random access memory and/or read-only memory device.

Software elements (programs) may be located in the working memory 2014, and may include, but is not limited to, an operating system 2016, one or more application programs 2018, driver programs, and/or other data and code. The instructions for performing the foregoing methods and steps may be comprised in the one or more application programs 2018, and the foregoing federated learning methods for improving matching efficiency may each be implemented by the instructions of the one or more application programs 2018 being read and executed by the processor 2004. More specifically, in the foregoing federated learning method for improving matching efficiency, steps 210 to 230 may be implemented, for example, by the processor 2004 by executing the application program 2018 having instructions for performing steps 210 to 230. Moreover, other steps of the foregoing federated learning method for improving matching efficiency may be implemented, for example, by the processor 2004 by executing the application program 2018 having instructions for performing corresponding steps. Executable code or source code of the instructions of the software elements (programs) may be stored in a non-transitory computer-readable storage medium (e.g., the storage device 2010), and may be stored in the working memory 2014 (may be compiled and/or installed) when executed. The executable code or source code of the instructions of the software elements (programs) may also be downloaded from a remote location.

It should further be appreciated that various variations may be made according to specific requirements. For example, tailored hardware may also be used, and/or specific elements may be implemented in hardware, software, firmware, middleware, microcode, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in accordance with the present disclosure.

It should further be understood that the components of the computing device 2000 can be distributed over a network. For example, some processing may be executed by one processor while other processing may be executed by another processor away from the one processor. Other components of the computing system 2000 may also be similarly distributed. As such, the computing device 2000 can be interpreted as a distributed computing system that performs processing at a plurality of locations.

Although the embodiments or examples of the present disclosure have been described with reference to the drawings, it should be appreciated that the methods, systems and devices described above are merely exemplary embodiments or examples, and the scope of the present invention is not limited by the embodiments or examples, but only defined by the granted claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The invention claimed is:

1. A computer-implemented method comprising:
sending, by one or more computers, in response to a number of data providers for federated learning being greater than a first threshold, a data field required for the federated learning to a coordinator, the coordinator comprising a computer;
receiving, by the one or more computers, from the coordinator, information about one or more data providers comprising the required data field, for determining the data providers comprising the required data field as remaining data providers, wherein the coordinator stores a data field of each data provider;
acquiring, by the one or more computers, in response to a number of the remaining data providers being greater than the first threshold, a first public key from the coordinator to encrypt a local user ID, wherein the local user ID is a user ID of a data user;
acquiring a user ID, by the one or more computers, which has been encrypted with a second public key, of each of the remaining data providers, wherein the second public key for the remaining data provider is acquired from the coordinator;
acquiring, by the one or more computers, an overlap rate by comparing the local user ID with the acquired user ID of each of the remaining data providers; and
screening, by the one or more computers, to obtain one or more data providers with an overlap rate being greater than a second threshold, to use the one or more data providers obtained by screening as new remaining data providers; and
performing, by the one or more computers, federated learning-based modeling with each of the remaining data providers.

2. The method of claim 1, further comprising:
acquiring, by the one or more computers, in response to the number of the remaining data providers being greater than the first threshold, a statistical indicator of respective data fields of the remaining data providers; and
performing, by the one or more computers, screening on the remaining data providers based on the statistical indicator, to use one or more data providers obtained by screening as new remaining data providers.

3. The method of claim 2, wherein the statistical indicator comprises one or more of the following: a mean value, a maximum value, and a minimum value.

4. The method of claim 1, wherein performing federated learning-based modeling with each of the remaining data providers comprises:
screening, by the one or more computers, feature data that is common with each of the remaining data providers by invoking a feature screening model; and
performing, by the one or more computers, federated learning-based modeling with each of the remaining data providers based on the feature data.

5. The method of claim 1, wherein the required data field comprises a time interval.

6. An electronic device, comprising:
a memory storing one or more programs configured to be executed by one or more processors, the one or more programs including instructions for causing the electronic device to perform operations comprising:
sending, in response to a number of data providers for federated learning being greater than a first threshold, a data field required for the federated learning to a coordinator;
receiving, from the coordinator, information about one or more data providers comprising the required data field, for determining the data providers comprising the required data field as remaining data providers, wherein the coordinator stores a data field of each data provider;
acquiring, in response to a number of the remaining data providers being greater than the first threshold, a first public key from the coordinator to encrypt a local user ID, wherein the local user ID is a user ID of a data user;
acquiring a user ID, which has been encrypted with a second public key, of each of the remaining data providers, wherein the second public key for the remaining data provider is acquired from the coordinator;
acquiring an overlap rate by comparing the local user ID with the acquired user ID of each of the remaining data providers; and
screening to obtain one or more data providers with an overlap rate being greater than a second threshold, to use the one or more data providers obtained by screening as new remaining data providers; and
performing federated learning-based modeling with each of the remaining data providers.

7. The electronic device of claim 6, the one or more programs further including instructions for causing the electronic device to perform operations comprising:
acquiring, in response to the number of the remaining data providers being greater than the first threshold, a statistical indicator of respective data fields of the remaining data providers; and
performing screening on the remaining data providers based on the statistical indicator, to use one or more data providers obtained by screening as new remaining data providers.

8. The electronic device of claim 7, wherein the statistical indicator comprises one or more of the following: a mean value, a maximum value, and a minimum value.

9. The electronic device of claim 6, wherein performing federated learning-based modeling with each of the remaining data providers comprises:
screening, feature data that is common with each of the remaining data providers by invoking a feature screening model; and
performing federated learning-based modeling with each of one or more remaining data providers based on the feature data.

10. A non-transitory computer-readable storage medium that stores one or more programs comprising instructions that, when executed by one or more processors of an electronic device, cause the electronic device to implement operations comprising:
- sending, in response to a number of data providers for federated learning being greater than a first threshold, a data field required for the federated learning to a coordinator, the coordinator comprising a computer;
- receiving, from the coordinator, information about one or more data providers comprising the required data field, for determining the data providers corresponding to information comprising the required data field as remaining data providers, wherein the coordinator stores a data field of each data provider;
- acquiring, in response to a number of the remaining data providers being greater than the first threshold, a first public key from the coordinator to encrypt a local user ID, wherein the local user ID is a user ID of a data user;
- acquiring a user ID, which has been encrypted with a second public key, of each of the remaining data providers, wherein the second public key for the remaining data provider is acquired from the coordinator;
- acquiring an overlap rate by comparing the local user ID with the acquired user ID of each of the remaining data providers; and
- screening to obtain one or more data providers with an overlap rate being greater than a second threshold, to use the one or more data providers obtained by screening as new remaining data providers, and
- performing federated learning-based modeling with each of the remaining data providers.

11. The non-transitory computer-readable storage medium of claim 10, the operations further comprising:
- acquiring, in response to the number of the remaining data providers being greater than the first threshold, a statistical indicator of respective data fields of the remaining data providers; and
- performing screening on the remaining data providers based on the statistical indicator, to use one or more data providers obtained by screening as new remaining data providers.

12. The non-transitory computer-readable storage medium of claim 11, wherein the statistical indicator comprises one or more of the following: a mean value, a maximum value, and a minimum value.

13. The non-transitory computer-readable storage medium of claim 10, wherein the performing federated learning-based modeling with each of the remaining data providers comprises:
- screening, feature data that is common with each of the remaining data providers by invoking a feature screening model; and
- performing federated learning-based modeling with each of the one or more remaining data providers based on the feature data.

* * * * *